Sept. 28, 1965   T. S. LASZLO   3,208,447
APPARATUS FOR TRAPPING RADIANT ENERGY AND PARTICLES
Filed Nov. 13, 1961

TIBOR S. LASZLO
INVENTOR.

BY Alden D. Redfield
Melvin E. Frederick
ATTORNEYS

United States Patent Office 3,208,447
Patented Sept. 28, 1965

3,208,447
APPARATUS FOR TRAPPING RADIANT ENERGY AND PARTICLES
Tibor S. Laszlo, Melrose, Mass., assignor to Avco Corporation, Cincinnati, Ohio, a corporation of Delaware
Filed Nov. 13, 1961, Ser. No. 151,888
3 Claims. (Cl. 126—270)

The present invention relates to apparatus for trapping radiant energy, particles and the like and, more particularly, to artificial black bodies for absorbing radiant energy. For convenience, the present invention is described with particular reference to artificial black bodies for measuring radiant energy, but it is not limited to such applications.

The high temperatures encountered when using radiant energy are determined usually by measuring the heat flux impinging upon or emitted by a substance. The flux may be measured with calorimeters or with radiometers calibrated with calorimeters. Several suitable water-cooled calorimeters containing a spherical cavity as an artificial black body to absorb incident radiation have been designed.

In its broadest concept the present invention contemplates the provision of a cavity formed by a first convergent surface of rotational symmetry closed at its larger end and open at its smaller end and second means closing the larger end of the first surface including a second surface of rotational symmetry convergent in the same direction as the first surface.

In particular, the present invention contemplates the provision of a new artificial black body having an orifice, a circular, conical sidewall, and an end wall opposite the orifice and convergent in the same direction as the sidewall. The sidewall delineates a truncated right conical surface with an orifice at the smaller end. The larger end may be closed by a wall delineating at least one circular, conical surface.

It is, therefore, an object of the present invention to provide improved apparatus for trapping radiant energy, particles and the like.

It is another object of the present invention to provide an improved shape for artificial black bodies.

Another object of the present invention is to provide an artificial black body having greater absorptivity and/or emissivity characteristics than that heretofore available.

The novel features that are considered characteristic of the present invention are set forth in the appended claims; the invention itself, however, both as to its organization and method of operation, together with additional objects and advantages thereof, will best be understood from the following description of specific embodiments when read in conjunction with the accompanying drawings, in which:

FIGURES 1, 2, and 3 are diagrammatical representations in section of prior art shapes for artificial black bodies;

The problem of finding the optimum shape for an artificial black body has been investigated extensively and reported in the literature. Of the literature available on this subject, attention is directed in particular to H. Buckley's "On the Radiation from the Inside of a Circular Cylinder," Philosophical Magazine; vol. 4, 1927, p. 753; vol. 6, 1928, p. 447; vol. 17, 1934, p. 576; and A. Gouffe's "Corrections d'ouverture des crops-noir artificiels compte tenu des diffusions multiples internes," Revue D'Optique, vol. 24, January–March 1945, Nos. 1–3, p. 1.

In Buckley's study of the radiation from the inside of a circular cylinder, he derived an expression for the radiation from an annulus to any other annulus in a cylinder of infinite length taking into account multiple reflections. He then applied the same method to the case of a finite, uniformly heated cylinder and obtained an approximate solution. Finally, he adapted the method to the problem of a uniformly heated finite cylinder closed at one end; a shape which closely approximates artificial black bodies being used in optical pyrometry.

One of the most interesting results of his work is the relation between cylinder length and orifice radius. It is shown that if a cylinder wall has an emissivity of 0.75, a cylinder length/orifice radius ratio of 3.80 gives radiation intensities within 1% of black body radiation. The ratio of cylinder length to orifice radius decreases rapidly as the emissivity of the wall increases, with the result that for materials of high emissivity the length of the cavity can be greatly reduced without reducing the orifice radius.

Gouffe compared the sphere, the cylinder and the cone in his search for an optimum artificial black body shape. Directing attention now to FIGURES 1, 2 and 3 which illustrate the shapes considered by Gouffe, he based his comparison on the value $L/r$, where $L$ is the length of the black body and $r$ is the radius of the orifice. From these data he calculated the total surface area $S$ of the cavity and the surface area $s$ of the orifice. Thus, the ratio $s/S$ expresses the relative value of a cavity as an absorber. In this connection, however, it should be noted, in Gouffe's calculations $S$ includes the area of the orifice $s$ which is not an absorbing surface. Although it is not necessary for purposes of comparison, a more precise expression for the value of the cavity would be $s/S-s$.

Figure 4:
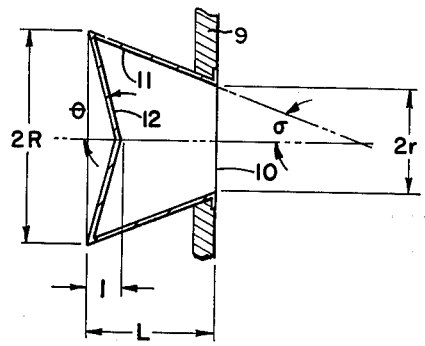
FIGURE 4 is a diagrammatical representation in section of apparatus constructed in accordance with the present invention.

A preferred shape of an artificial black body in accordance with the present invention is illustrated in FIGURE 4. The improved black body in this figure is illustrated as having an orifice 10, sidewalls 11, and an end wall 12. The sidewalls 11 delineate a truncated right conical surface with the orifice 10 at the smaller end. The end wall 12 delineates a right circular, conical surface wherein the apex thereof is directed toward the orifice. The walls 11 and 12 may be formed from a suitable metal coated with platinum black or camphor soot. If needed, walls 11 and 12 may be formed from materials of low emissivity, such as uncoated platinum, copper and the like. The black body may be supported in any suitable manner as by attaching side walls 11 in any suitable manner to a supporting wall 9.

In FIGURE 4, the diameter of the orifice is designated $2r$, and the diameter of the rear wall $2R$, where $r$ and $R$ are the radii of, respectively, the orifice and rear wall. The maximum length of the cavity is designated by $L$, and the height or distance the rear surface projects toward the orifice is designated by $l$.

The angle between the wall 11 and the optical axis is designated by $\sigma$ and the angle between the rear wall 12 and the optical axis is designated $\theta$. The angle $\theta$ should be less than 90° and greater than $\sigma$, and the height $l$ should be greater than zero and less than L.

Figure 1:
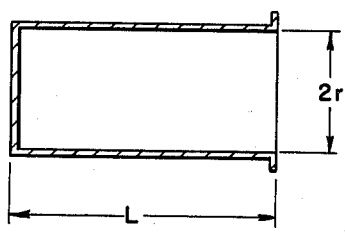
Figure 2:
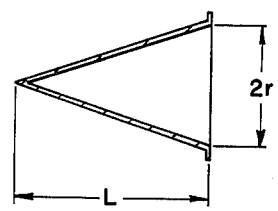
Figure 3:
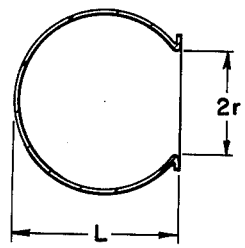

By application of Gouffe's method of evaluation to the present invention and to the shapes he considered (and which are illustrated in FIGURES 1, 2, and 3) data for these shapes may be compared to illustrate the value of the present invention. The results are presented in the following table, designated Table I.

TABLE I

| L/r | s/S | | | | s/S−s/S₀ | | |
|---|---|---|---|---|---|---|---|
| | 1 | 2 | 3 | 4 | 5 | 6 | 7 |
| | Sphere | Cylinder | Cone | Double Cone | Cylinder | Cone | Double Cone |
| 1 | 0.500 | 0.250 | 0.415 | 0.175 | −0.250 | −0.085 | −0.325 |
| 2 | 0.200 | 0.167 | 0.309 | 0.094 | −0.033 | +0.109 | −0.106 |
| 3 | 0.100 | 0.125 | 0.241 | 0.059 | +0.025 | +0.141 | −0.041 |
| 4 | 0.059 | 0.100 | 0.195 | 0.041 | +0.041 | +0.136 | −0.018 |
| 5 | 0.039 | 0.083 | 0.164 | 0.030 | +0.044 | +0.125 | −0.009 |
| 8 | 0.016 | 0.056 | 0.111 | 0.015 | +0.040 | +0.095 | −0.001 |

Thus, it may be seen by inspection of Table I that for various $L/r$ ratios, columns 1–3 give the $s/S$ values for, respectively, the prior art spherical, cylindrical, and conical shapes (FIGURES 1–3) considered by Gouffe, and column 4 gives the $s/S$ values for a double conical shape (FIGURE 4) in accordance with the present invention. Columns 5–7 give values resulting from comparison of the cylindrical, conical and double conical shapes with the spherical shape, i.e., $s/S - s/S_0$ where for a given $L/r$ ratio, $s/S_0$ is the value for the spherical shape (column 1) and $s/S$ is the value for the cylindrical, conical and double conical shapes, respectively (columns 2–4).

It was previously pointed out that the ratio $s/S$ expresses the relative value of a cavity as an absorber. Further, of the prior art shapes, the spherical shape is generally preferable.

Thus, the data in Table I shows that if the $L/r$ value is greater than 2, both the cylinder and cone are inferior to the sphere as determined by the $s/S$ value. It may readily be seen, however, that the double cone shape in accordance with the present invention results in an $S/S$ value which is more favorable than that for any of the prior art shapes and particularly that for a sphere, even for $L/r$ ratios as high as eight. A ratio greater than eight is required only if the emissivity of the wall material is as low as .25, an unlikely choice indeed for the cavity material.

An artificial black body having a wall thickness of .015 inch, the interior surfaces of which were coated with platinum black and constructed in accordance with the embodiment illustrated in FIGURE 4, had the following dimensions:

$2r = .625$ inch
$2R = 1.437$ inches
$L = .920$ inch
$l = .187$ inch
$\theta = 75°$
$\sigma = 23°$ Results of tests of a water-cooled calorimeter containing an artificial black body constructed as described immediately hereinabove indicated that the black body absorbed 30–40% more of the incident radiant energy from a solar furnace than a spherical shape having the same L and r values, which shape heretofore was considered to be the best available.

Figure 5:
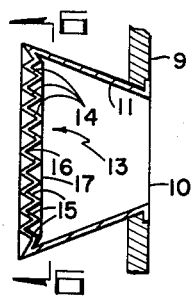
FIGURE 5 is a diagrammatical representation in section illustrating an alternate embodiment of the present invention.
Figure 6:
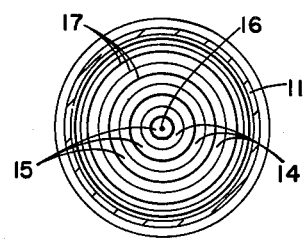
FIGURE 6 is an end view taken on line 6—6 of FIGURE 5.

A modification of the present invention is illustrated in FIGURES 5 and 6. As shown in these figures, the end wall 12 of FIGURE 4 is replaced by an end wall 13 comprising a plurality of circular, conical surfaces 14–15 that alternately converge and diverge in the direction of the orifice 10.

Since the innermost surface 15 is a right circular, conical surface, it forms a point 16. Progressing radially outwardly, the end portions of the surfaces 14–15 meet to form circular apexes 17. The point 16 and the circular apexes 17 are located within, or surrounded by, the sidewall 11. Further, the mid points of the surfaces 14–15 all lie in a common plane normal to the optical axis which passes through point 16.

For convenience, the foregoing description has been directed primarily to artificial black bodies. It should be understood, however, that the same principles can be applied to means for trapping particles of finite sizes and all types of radiant energy.

The various features and advantages of the invention are thought to be clear from the foregoing description. Various other features and advantages not specifically enumerated will undoubtedly occur to those versed in the art as likewise will many variations and modifications of the embodiment of the invention illustrated, all of which may be achieved without departing from the spirit and scope of the invention as defined by the following claims:

I claim:

1. In a device for trapping radiant energy and particles, the combination comprising: a first truncated right conical and opaque surface open at its smaller end and having a high emissivity, said right conical surface having a height L, a longitudinal axis, and being disposed at an angle $\sigma$ with respect to said axis; means for supporting said first surface for receiving radiant energy; and a second right conical and opaque surface closing the larger end of said truncated conical surface and converging in the same direction as said truncated conical surface with respect to said axis, said second conical surface having a high emissivity and a height $l$ and being disposed at an angle $\theta$ with respect to said axis, said angle $\theta$ being less than 90° and greater than $\sigma$ and said height $l$ being greater than zero and less than L, said first and second surfaces being substantially coaxial.

2. In a device for trapping radiant energy and particles, the combination comprising: first means delineating a first truncated right conical and opaque surface open at its smaller end and having a high emissivity, said truncated conical surface having a height L, a longitudinal axis, and being dosposed at an angle $\sigma$ with respect to said axis; means for supporting said first surface for receiving radiant energy; and second opaque means closing the larger end of said truncated conical surface delineating a plurality of concentric circular, conical surfaces having a high emissivity, said concentric conical surfaces alternately converging and diverging with respect to said axis in the direction of said open end to form a plurality of circular apexes within said first means, said concentric conical surfaces having a height 1 and being disposed at an angle $\theta$ with respect to said axis, said angle $\theta$ being less than 90° and greater than $\sigma$ and said height $l$ being greater than zero and less than L.

3. In a device for trapping radiant energy and particles, the combination comprising: first means delineating a first truncated right conical and opaque surface open at its smaller end and having a high emissivity, said truncated conical surface having a height L, a longitudinal axis, and being disposed at an angle $\sigma$ with respect to said axis; means for supporting said first surface for receiving radiant energy; and second opaque means closing the larger end of said truncated conical surface delineating a plurality of concentric circular, conical surfaces having a high emissivity, said concentric conical surfaces alternately converging and diverging with respect to said axis in the direction of said open end and forming a single point and a plurality of circular apexes lying in substantially the same plane, said concentric conical surfaces having a height $l$ and being disposed at an angle $\theta$ with respect to said axis, said angle $\theta$ being less than 90° and greater than $\sigma$ and said height $l$ being greater than zero and less than L.

References Cited by the Examiner

UNITED STATES PATENTS

| | | | |
|---|---|---|---|
| 519,887 | 5/94 | Davis | 122—180 |
| 1,447,414 | 3/23 | Eustege | 126—390 |
| 1,661,473 | 3/28 | Goddard et al. | 250—88 |
| 2,015,520 | 9/35 | Geffcken et al. | 313—113 |
| 2,272,186 | 2/42 | Creehan | 313—113.1 |
| 2,686,267 | 8/54 | Vogel | 250—86 |
| 2,876,375 | 3/59 | Marsh | 313—113 |

FOREIGN PATENTS 1,122,344    5/56    France.

OTHER REFERENCES

"Corrections d'ouverture des corps-noirs artificiels compte tenu des diffusions multiples internes," by A. Gouffe, from "Revue D'Optique," vol. 24, January–March 1945, Nos. 1–3, pp. 1 to 10.

JAMES W. WESTHAVER, *Primary Examiner*.

RALPH G. NILSON, *Examiner*.